United States Patent [19]
Lochridge

[11] 3,978,677
[45] Sept. 7, 1976

[54] METHOD OF STARTING AND LAYING SUBMERGIBLE ELONGATE STRUCTURES

[75] Inventor: Joe C. Lochridge, Houston, Tex.
[73] Assignee: Brown & Root Inc., Houston, Tex.
[22] Filed: Mar. 2, 1972
[21] Appl. No.: 231,201

[52] U.S. Cl.................................. 61/72.3; 193/38; 193/42
[51] Int. Cl............................ F16l 1/00; B65g 9/00
[58] Field of Search.................. 61/72.3, 72.1, 72.4; 193/38, 42

[56] References Cited
UNITED STATES PATENTS

| 580,226 | 4/1897 | Sanford................................ | 61/72.3 |
| 3,466,881 | 9/1969 | Lamy.................................... | 61/72.3 |

FOREIGN PATENTS OR APPLICATIONS

| 636,237 | 10/1936 | Germany............................ | 61/72.1 |
| 1,116,757 | 6/1968 | United Kingdom.................. | 61/72.3 |

Primary Examiner—Jacob Shapiro
Attorney, Agent, or Firm—James E. Cockfield

[57] ABSTRACT

A process for starting and laying a submergible elongate structure, such as a pipeline, upon the bed of a body of water from a marine vessel, while controlling the bending configuration thereof. The method includes the steps of tensioning a flexible cable between a marine vessel and a submerged hook-up facility, progressively suspending portions of a pipeline from the tensioned cable by means of spaced hangers, and extending the pipeline toward the submerged facility. The process may be employed solely to initially start to lay a submergible elongate structure or the process may be employed to both start to lay a submergible elongate structure and to subsequently lay a submergible elongate structure.

14 Claims, 6 Drawing Figures

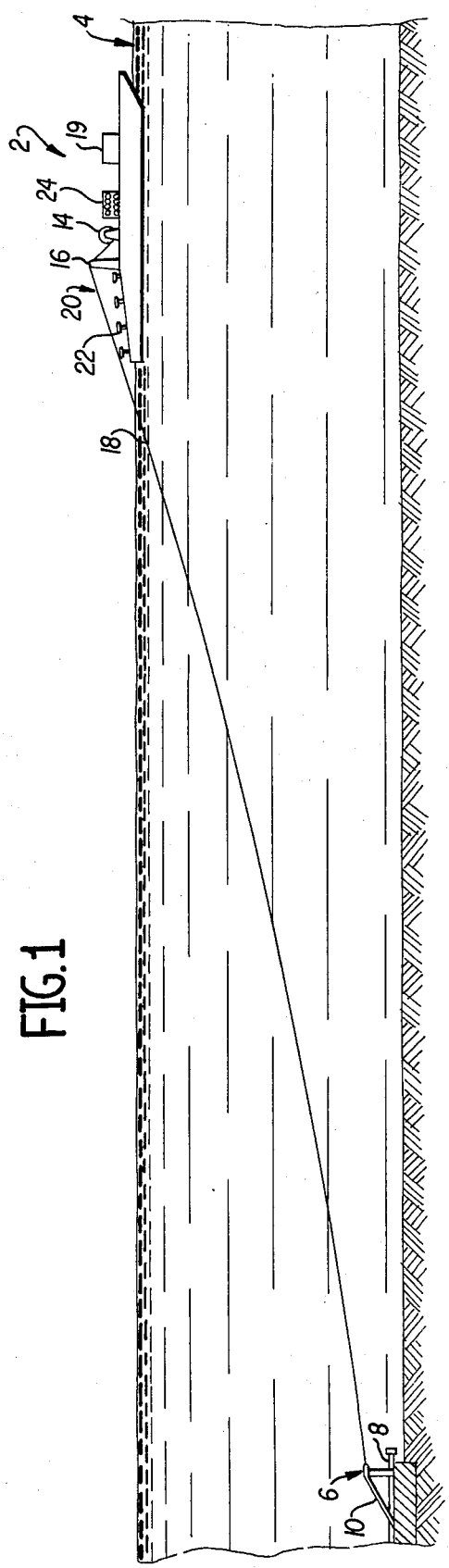
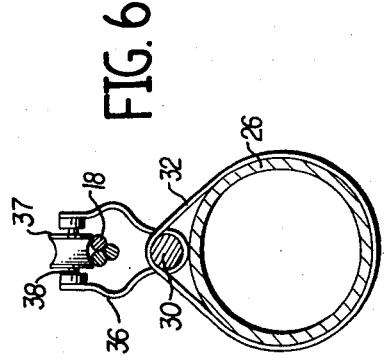
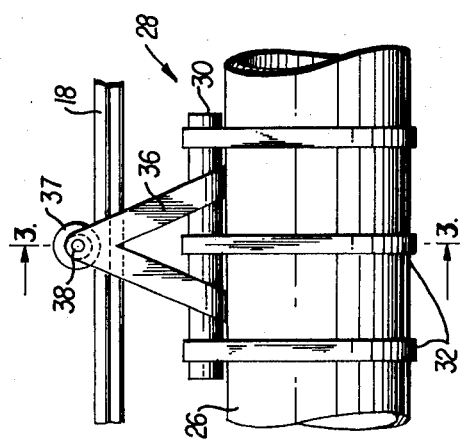
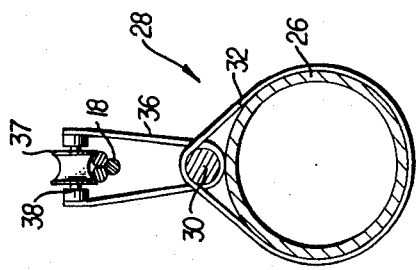

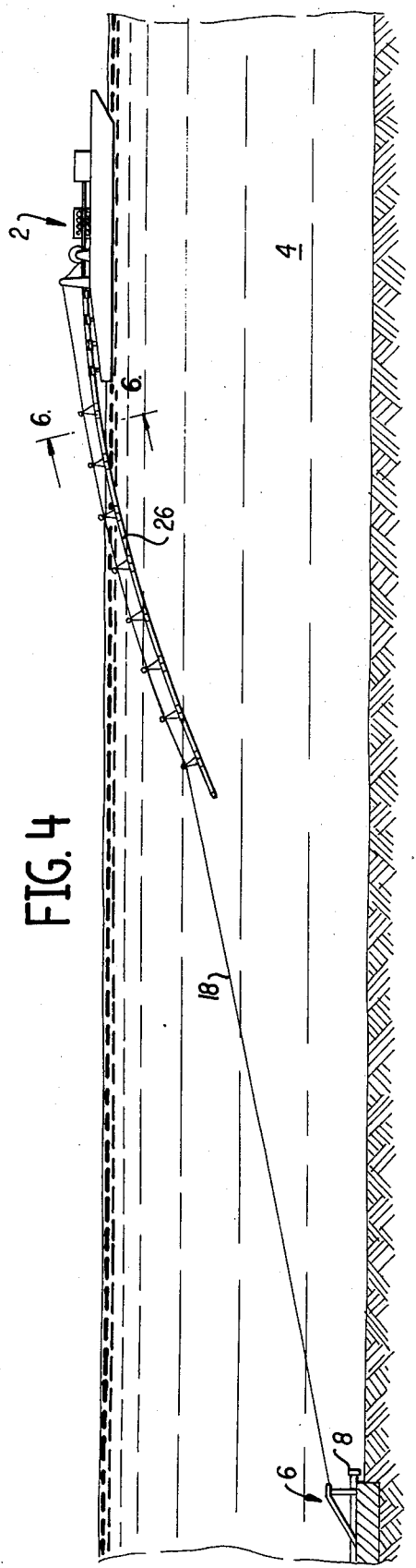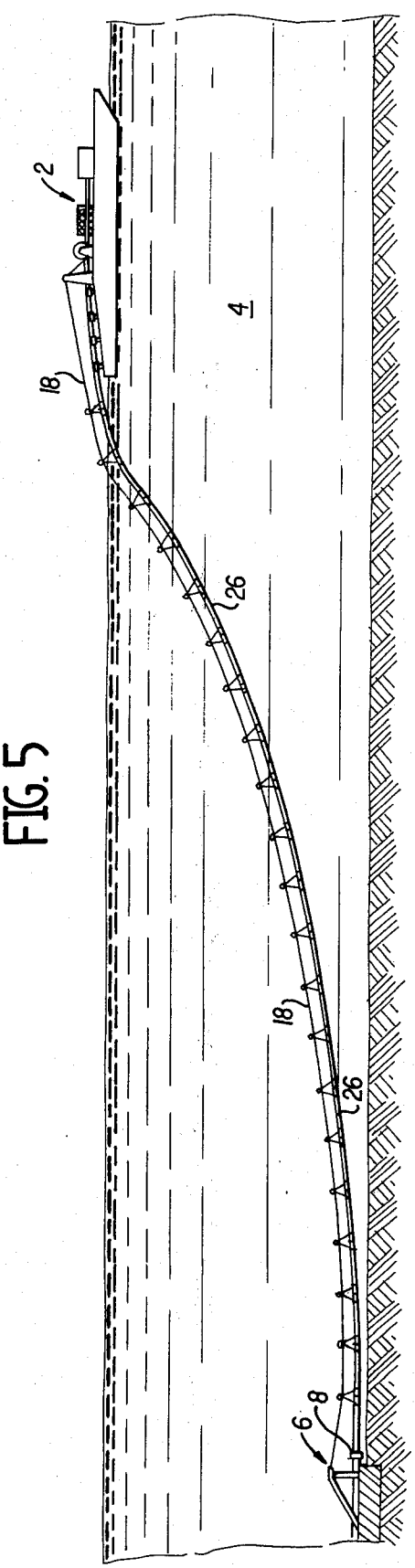

METHOD OF STARTING AND LAYING SUBMERGIBLE ELONGATE STRUCTURES

BACKGROUND OF THE INVENTION

This invention relates to a process for starting and for subsequently laying a submergible elongate structure upon the bed of a body of water. More particularly the invention relates to a process for starting and for subsequently laying a pipeline upon a water bed.

During underwater pipelaying operations, in which pipe is laid from a floating marine vessel onto the bed of a body of water, it is imperative that the elastic bending limit of the pipeline should not be unduly exceeded. In this connection if the bending radius of the pipeline becomes too small, as is possible in the case of a pipeline which is permitted to sink from a barge under its own weight without restraint, the pipeline may become permanently deformed, cracked, or otherwise rendered unusable.

Prior art attempts to provide support for a pipeline, as it is being lowered, include the use of buoyant devices which are positioned within the water in a manner to support and guide the pipeline along a proper bending curvature. These buoyant devices have been used in combination with ramps or stingers which project form the vessel and underlie the pipeline, during at least part of its submerged descent. Examples of previously known stinger or ramp devices are disclosed in U.S. Pats. Nos. 2,910,835 to Timothy, 3,280,571 to Hauber et al., 3,390,532 to Lawrence, 3,487,648 to Lawrence, 3,507,126 to Rochelle et al., 3,566,609 to Smith and 3,606,759 to Lochridge.

While such devices have proved to be highly satisfactory the initial capital cost may in some instances be prohibitive. Moreover, large ramps may be difficult to manipulate during some laying operations, such as in deep water.

Recently, dynamic tensioning units have been developed which apply, from the marine vessel, a longitudinal restraining force directly upon the pipeline as it is payed out to replace or supplement the function of the previously known stinger devices. For a full understanding of dynamic tension pipelying methods and apparatus reference may be had to U.S. Pats. Nos. 3,390,532 to Lawrence and 3,487,648 to Lawrence.

Notwithstanding the high degree of success achieved by dynamic tension pipelaying operations, care must be taken when using these units to prevent damage to the pipeline coatings particularly where it is necessary to apply high tension forces. Moreover, when applying tension to a pipeline, it is necessary that there be a reaction force within the pipeline. Hence, unless the pipeline is anchored, tensioning units are ineffective during an initial laying operation. Moreover, as a pipeline is being initially laid, it is often desirable to connect the free end thereof to a hook-up facility of some type, such as a submerged pipe installation or a riser. Once the coupling is made, it is desirable that initial tension on the pipeline be kept at a minimum to prevent undue stress from being applied to the coupling joint.

OBJECTS AND SUMMARY OF THE INVENTION

OBJECTS

It is therefore a general object of the invention to obviate or minimize problems of the type previously described.

It is a primary object of the invention to provide a simplified method for laying a pipeline in which a suitable radius of curvature may be maintained on the pipeline independently of the use of complicated and expensive buoyant devices and submerged ramp structures.

It is another object of the invention to provide a method for laying a pipeline in which tensioning forces for maintaining a suitable radius of curvature on the pipeline are imposed without placing stress upon an initial installation coupling.

It is a further object of the invention to provide a method for initially laying or starting to lay a pipline upon the bed of a body of water while maintaining a suitable radius of curvature of the pipeline.

It is yet a further object of the invention to provide a method for initially starting to lay a pipeline upon the bed of a body of water and then continuing to economically and advantageously lay the pipeline upon the water bed.

It is a specific object of the invention to provide a method of starting to lay and laying a pipeline where tension forces are necessary to maintain a proper pipeline curvature.

BRIEF SUMMARY

AT least some of the foregoing objects are accomplished through a pipelaying method in which a flexible line, such as a wire rope or cable, is anchored at one end adjacent a submerged pipe-coupling installation and is connected at the other end thereof to a marine vessel which is supported upon a water surface. The other end of the cable is drawn up relative to the anchored end until the cable is suitably placed under tension.

Once the cable is tensioned, portions of a pipeline are processively suspended from the cable, at a station upon the marine vessel. As the pipeline advances toward the submerged installation, it is supported and guided by the tensioned cable so as to assume and maintain an acceptable radius of curvature or profile during the descent.

The pipeline, which may be of a continuous type wound around a drum, or of a type which is formed or integrally united during the laying operation by welding together individual pipe sections, may then be secured, at the free end thereof to the submerged installation.

At this juncture, the cable may be disconnected from the marine vessel, and the remaining portions of the pipeline may be laid in a conventional dynamic tensioning manner.

Within the purview of the present invention, however, the cable may alternatively be kept in the anchored position and utilized during remaining pipelaying operations. In such operations, tension is maintained on the cable between the anchor and the marine vessel to enable the cable to constantly support and guide the pipeline. A tension winch or the like is provided on the vessel deck for paying out the cable with proper tension.

During the initial and subsequent laying operations of the pipeline, a suspension assembly is provided for translatably suspending the pipeline from the cable. Such an assembly preferably comprises a plurality of support hangers secured to the pipeline at spaced intervals, with rollers being employed to provide free translation of the pipeline along the cable. The support hangers may conveniently include flexible straps to enable each hanger to accommodate changes in the distance between the cable and the pipeline which may tend to occur as the pipeline is being payed out.

DRAWINGS

In describing the invention, reference will be made to a preferred embodiment illustrated in the drawings in which:

FIG. 1 is a schematic view of an initial aspect of the invention, wherein a cable has been tensioned between a submerged hook-up facility and a floating marine vessel;

FIG. 2 is an enlarged view of a preferred form of a support hanger according to the invention;

FIG. 3 is a sectional view of a pipeline, as it is supported by the cable, taken along the section 3—3 in FIG. 2;

FIG. 4 is a schematic view similar to FIG. 1 and additionally discloses the initial end of a pipeline suspended from the tensioned cable.

FIG. 5 is a schematic view of the cable and pipeline following a hook-up of the pipeline to a submerged installation; and FIG. 6 is a sectional view of the pipeline, taken along the section 6—6 of FIG. 2, in which the preferred support hanger is in a slackened state.

DETAILED DESCRIPTION OF A PREFERRED EMBODIMENT OF THE INVENTION

In preparation for a pipeline laying operation, a pipelaying vessel, or lay barge 2, is floatingly supported upon the surface of a body of water 4 adjacent an underwater hook-up facility 6, as is illustrated in FIG. 1. The hook-up facility 6 includes a submerged pipe installation 8, which may comprise a section of a riser, or the like, and an anchor junction 10 which is designed to be immovably mounted.

The lay barge 2 includes a cable pay-out assembly comprising a power-driven, tension winch 14 of a conventional type, and a guide post 16. The guide post 16 may be provided with a rotatable pulley at the apex thereof over which one end of a flexible wire rope, or cable 18 may be trained.

The barge 2 further includes a pipeline make-up facility 19 positioned adjacent the forward end of the barge, and an inclined ramp portion 20 located at the rearward end of the barge. The make-up facility 19 may comprise a drum around which a continuous pipeline is wound, or may comprise one or more pipe welding stations for sequentially aligning and welding together individual pipe sections.

The ramp portion 20 includes a series of aligned pedestal supports 22, preferably including rollers, which define a pipeline discharge path.

A dynamic tensioning unit 24 may be provided on the barge intermediate the make-up facility 19 and the inclined ramp portion 20, as is illustrated in FIG. 1. The structure and operation of the dynamic tensioning are disclosed in U.S. Pats. Nos. 3,390,532 to Lawrence and 3,487,648 to Lawrence, both assigned to the assignee of the subject application. The disclosures of these patents are hereby incorporated by reference as though set forth at length.

To prepare for an initial laying operation of the pipeline, the free end of the cable 18 is secured to the anchor 10 adjacent the submerged pipe installation 8.

The other end of the cable is then drawn up relative to the anchor to impart a desired tensioning of the cable 18.

In one instance, this manipulation may be provided by rotation of the winch 14, with the barge 2 being held against movement by conventional anchor lines (not shown). As the cable 18 is wound up, it will be tightened, until the desired tensioning is attained.

Another manner of manipulating the cable comprises locking the winch 14 against rotation to define a constant cable length, and advancing, or laying away, the barge by means of conventional anchor winches (not shown), to tighten the cable.

In the latter case, if the cable is to be employed solely for initially laying the pipeline, the winch 14 could be dispensed with and the vessel end of the cable 18 could be secured directly to the guide post 16.

To enable a pipeline 26 to be supported from and guided along the cable 18, a suspension assembly is provided which will mount the pipeline 26 on the cable 18 for free translating movement therealong. In the preferred form of the invention, such a suspension assembly consists of a plurality of support hangers 28 which are rigidly supported along a pipeline 26 at spaced intervals.

Each support hanger 28 comprises a rod 30 which is secured to the pipeline by means of a plurality of bands 32, the latter extending around the pipeline 26. The bands 32 may be formed by any suitable material having high tensile strength properties, such as, for example, steel.

Each support hanger 28 further includes a suspending member for providing a translatable connection with the cable 18. This suspended member preferably comprises straps 36 which are wrapped around the rod 30 so as to define a pair of converging legs on each side of the rod 30, as can be seen in FIGS. 2 and 3. In the assembled condition of the hanger, a roller 37 is journaled for rotation at an intersecting portion of the straps 36, by means of a pin 38, and is positioned for movement on the cable 18.

It should be apparent from the foregoing, that each of the support hangers 28 may be mounted for free translational movement along the cable 18.

It is preferable that the support hangers include means for accommodating variations in the separation distance between the cable and pipeline during the laying operation to enable the roller 37 to maintain contact with the cable 18. Note, for example, that this distance may be less adjacent the terminal end of the ramp 20 than at other locations along the cable.

To accomodate such variation in separation distance, the straps 36 of the preferred hanger 28 are formed from a sufficiently flexible material so that the straps may slaken in a manner permitting the roller 37 to maintain contact with the cable 18, as shown in FIG. 6.

While the above described description pertains to a preferred embodiment, a number of variations of the suspending member are possible. In this connection, in lieu of securing support hangers to the pipeline 26, suitable hangers could be fixed to the cable 18. Such hangers, (not shown), would include downwardly extending pipe support means to translatably guide and support the pipeline. It is required, however, that such a member must be adapted to translatably support the pipeline, and it is desirable that the member be capable of accommodating variations in the separation distance.

During the laying operation it is required that, as portions of the pipeline reach the ramp 20, the pipeline must be suspended from the cable 18. There are numerous acceptable methods of assembling the hangers onto the pipeline and attaching the hangers to the cable.

For example, bands 32 of the metal type could be wrapped around the pipeline and fastened, to hold the rod 30 and the straps 36 in place. The roller 37 could be disassembled from the straps 36 prior to the pipeline reaching the cable 18 by removal of the pin 38. The roller may then be mounted on the cable by re-insertion of the pin 38 within the straps 36.

When the initial end of the pipeline 26 reaches the hook-up facility 6, it may be pulled into mating engagement with the pipe installation 8 and fixedly connected thereto. Alternatively, the pipe end may be stopped short of the installation 8, with an intermediate conduit being inserted to complete the hook-up.

OPERATION

With the barge 2 positioned adjacent an underwater hook-up facility 6, and with the cable 18 fixedly attached to the anchor 10, the winch 14 is rotated to suitably tension the cable 18.

Alternatively, the winch 14 may be fixed against rotation, with the barge 2 being advanced relative to the anchor. As previously noted, this laying away of the pipelaying vessel against a constant cable length causes the cable 18 to be tensioned.

After the cable is suitably tensioned for the particular pipeline to be laid, the pipeline is fed, by a suitable drive means, from the make-up facility 19 toward the ramp 20. The hangers 28 are suitably assembled and positioned on the pipeline. As the pipeline is being fed, portions thereof are progressively suspended from the tensioned cable 18 by means of the hangers 28.

As the pipeline progresses down the ramp 20, the separation distance between the pipeline and cable is likely to decrease, causing the straps 36 to become slackened, as is illustrated in FIG. 6.

As the pipeline progresses further down the tensioned cable 18, the cable begins to carry more of the load of the pipeline and the straps 36 will drop until the cable is carrying a full load of the pipeline.

The tension which is applied to the cable 18 prevents the pipeline from assuming too small a radius of curvature. The pipeline, as it descends, will roughly assume a sinuous S-shaped configuration, as best illustrated in FIG. 5.

When the pipeline 26 reaches the underwater facility 6, the pipeline may be pushed into mating engagement with the installation 8, or an intermediate conduit may be inserted, as has been previously noted.

With the initial installation now completed, the cable 18 may be disconnected from the vessel and the cable laying operation may be completed in a conventional fashion, such as by employing the dynamic tensioning unit 24, or other conventional supporting apparatus. It should be apparent that in lieu of disconnecting the cable from the vessel, the cable may be disconnected from the anchor and recovered by winding-up the winch.

According to the present invention, the remaining pipeline laying operation may also be accomplished while utilizing the tensioned cable 18 to maintain a proper radius of curvature on the pipeline. In such a case, the cable 18 is suitably payed out under tension by means of the tension winch 14. The operation may be completed, in suitable cases, without using the dynamic tensioning unit 24, while in other cases the dynamic tensioning unit may be employed in conjunction therewith. In either case, it will be apparent that the coupling between the installation 8 and the pipeline 26 will not be subjected to undue stresses.

MAJOR ADVANTAGES OF THE INVENTION

The present invention provides a simplified, yet effective, means of applying a support force to a pipeline being laid, in order to control the radius of bending. The invention may eliminate the need for expensive equipment such as submerged ramps and buoyant devices, which are often difficult to manipulate. Moreover the subject invention provides a method for starting to lay a pipeline in instances where conventional devices are often inadequate to perform the task.

Through the use of a tensioned cable, anchored between a hook-up facility and a barge, a pipeline may be supported and guided along an acceptable bending radius. This concept takes advantage of the fact that it is easier to apply a high tension to a cable than to a pipeline. For this reason, the present invention offers a distinct advantage over the dynamic tensioning units which apply a force directly to the pipeline.

Thus, the present invention may be practiced through the use of a cable-winding winch in lieu of a dynamic tensioner unit. In this manner, there is no danger of damage occurring to the pipeline coating, since there are not restraining wheels, or the like, directly engaging the pipeline.

Moreover, in the practice of the instant invention, the restraining forces which are applied to maintain a proper bending radius of the pipeline, i.e. the tension forces on the cable, are directed through the anchor 10 and not directly into the installation coupling, as might be the case when using a dynamic tensioning unit. Therefore, the stresses on the coupling may be kept to a minimum.

Even in the case where a dynamic tensioning unit is employed in conjunction with the cable 18, the requirements of the tensioning unit are reduced and the stress on the installation coupling may be kept within safe levels. In addition, with the requirements reduced, a tension unit of reduced capacity may be utilized.

As has been noted previously, the cable which is utilized in the instant invention may be recovered, when no longer required, by merely disconnecting the cable from the anchor and reeling it in by the winch 14.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method for starting to lay an integrally united submergible elongate structure upon the bed of a body of water, comprising the steps of:
    anchoring one end of a flexible cable adjacent a submerged installation, said installation being operable to connect to an initial end of the integrally united submergible elongate structure to be laid;

connecting the other end of the flexible cable to a marine vessel buoyantly supported upon the surface of a body of water;

tensioning the flexible cable extending between the anchor and the marine vessel;

progressively suspending and lowering sequential portions of the integrally united submergible elongate structure from the tensioned cable at a station upon the marine vessel;

slidably supporting from the flexible cable the integrally united submergible elongate structure between the marine vessel and the bed of the body of water; and maintaining a profile control over the integrally united submergible elongate structure between the marine vessel and the bed of the body of water.

2. A method for starting to lay a submergible elongate structure upon the bed of a body of water as defined in claim 1 and further comprising the step of:

connecting the initial end of the submergible elongate structure to the submerged installation.

3. A method for starting to lay a submergible elongate structure upon the bed of a body of water as defined in claim 1 wherein said step of tensioning comprises the step of:

laying away of the marine vessel against a constant cable length.

4. A method for starting to lay a submergible elongate structure upon the bed of a body of water as defined in claim 1 wherein said step of tensioning comprises the step of:

anchoring the marine vessel against displacement; and training the cable upon a tension winch positioned upon the marine vessel.

5. A method for starting to lay a submergible elongate structure upon the bed of a body of water as defined in claim 1 wherein said step of progressively suspending comprises the step of:

connecting hangers, at intervals, between the tensioned cable and the submergible elongate structure as the submergible elongate structure is being payed out from the marine vessel into the body of water.

6. A method for starting to lay a submergible elongate structure upon the bed of a body of water as defined in claim 5 wherein said step of connecting includes the steps of:

fixedly mounting the hangers upon the submergible elongate structure; and mounting the hangers on the tensioned cable for free translatable movement thereupon.

7. A method for laying an integrally united submergible elongate structure upon the bed of a body of water, comprising the steps of:

anchoring one end of a flexible cable adjacent to a submerged installation, said installation being operable to connect to an initial end of the integrally united submergible elongate structure to be laid;

connecting the other end of the flexible cable to a marine vessel buoyantly supported upon the surface of a body of water;

tensioning the flexible cable extending between the anchor and the marine vessel;

progressively suspending and lowering portions of the integrally united submergible elongate structure from the tensioned cable at a station upon the marine vessel;

connecting the initial end of the integrally united submergible elongate structure to the submerged installation;

slidably supporting from the tensioned cable the integrally united submergible elongate structure between the marine vessel and the bed of the body of water;

maintaining a profile control over the integrally united submergible elongate structure between the marine vessel and the bed of the body of water;

laying away the marine vessel along a desired route while causing the cable to be payed out under tension; and simultaneously progressively suspending and lowering additional portions of the integrally united submergible elongate structure from the tensioned cable for laying the elongate structure upon the bed of the body of water.

8. A method for laying a submergible elongate structure upon the bed of a body of water as defined in claim 7, comprising the further step of:

connecting hangers, at intervals, between the tensioned cable and the submergible elongate structure as the submergible elongate structure is being payed out from the marine vessel into the body of water.

9. A method for laying a submergible elongate structure upon the bed of a body of water as defined in claim 8, comprising the further steps of:

fixedly mounting the hangers upon the submergible elongate structure; and mounting the hangers on the tensioned cable for free translatable movement thereupon.

10. A method for laying a submergible elongate structure upon the bed of a body of water, comprising the steps of:

anchoring one end of a flexible cable adjacent to a submerged installation, said installation being operable to connect to an initial end of the submergible elongate structure to be laid;

connecting the other end of the flexible cable to a marine vessel buoyantly supported upon the surface of a body of water;

tensioning the flexible cable extending between the anchor and the marine vessel;

progressively suspending portions of the submergible elongate structure from the tensioned cable at a station upon the marine vessel;

connecting the initial end of the submergible elongate structure to the submerged installation;

dynamically tensioning the submergible elongate structure between the submerged installation and the marine vessel;

releasing the tension on the flexible cable; and laying away the marine vessel along a desired route and simultaneously issuing the submergible elongate structure to be laid from the marine vessel under dynamic tension.

11. A method for laying a submergible elongate structure upon the bed of a body of water as defined in claim 10, comprising the further step of:

connecting hangers, at intervals, between the tensioned cable and the submergible elongate structure as the submergible elongate structure is being payed out from the marine vessel into the body of water.

12. A method for laying a submergible elongate structure upon the bed of a body of water as defined in claim 11, comprising the further steps of:
   fixedly mounting the hangers upon the submergible elongate structure; and
   mounting the hangers on the tensioned cable for free translatable movement thereupon.

13. A method for laying an integrally united submergible elongate structure upon the bed of a body of water comprising the steps of:
   fixing one end of a flexible cable at a submerged location adjacent the bed of the body of water;
   connecting the other end of the flexible cable to a marine vessel buoyantly supported upon the surface of a body of water;
   tensioning the flexible cable between the submerged location and the marine vessel;
   laying away the vessel along a desired route while causing the cable to be payed out under tension; and simultaneously
   progressively suspending and lowering portions of the integrally united submergible elongate structure from the tensioned cable at a station upon the marine vessel including the steps of,
      fixedly mounting hangers at intervals upon one of said integrally united submergible elongate structure and said tensioned cable, and
      mounting the hangers upon the other of said integrally united submergible elongate structure and said tensioned cable for free translatable movement thereupon as the submergible elongate structure is being payed out from the marine vessel into the body of water
   slidably supporting from the tensioned cable the integrally united submergible elongate structure between the marine vessel and the bed of the body of water; and
   maintaining a profile control over the integrally united submergible elongate structure between the marine vessel and the bed of the body of water.

14. A method for laying a submergible elongate structure upon the bed of a body of water, comprising the steps of:
   anchoring one end of a flexible cable adjacent to a submerged installation, said installation being operable to connect to an initial end of the submergible elongate structure to be laid;
   connecting the other end of the flexible cable to a marine vessel buoyantly supported upon the surface of a body of water;
   tensioning the flexible cable extending between the anchor and the marine vessel;
   progressively suspending portions of the submergible elongate structure from the tensioned cable at a station upon the marine vessel;
   connecting the initial end of the submergible elongate structure to the submerged installation;
   dynamically tensioning the submergible elongate structure between the submerged installation and the marine vessel;
   maintaining the tension on the flexible cable;
   laying away the marine vessel along a desired route and simultaneously
   paying out the flexible cable under tension,
   suspending the submergible elongate structure from the flexible cable;
   lowering the submergible elongate structure into the body of water, and
   issuing the submergible elongate structure to be laid from the marine vessel under dynamic tension.

* * * * *

UNITED STATES PATENT AND TRADEMARK OFFICE
CERTIFICATE OF CORRECTION

PATENT NO. : 3,978,677
DATED : September 7, 1976
INVENTOR(S) : Joe C. Lochridge

It is certified that error appears in the above-identified patent and that said Letters Patent are hereby corrected as shown below:

In column 6, line 64, before "comprising" insert --said method--.

In column 6, line 65, following "being" insert --generally fixedly positioned and providing an elongate structure anchor--.

In column 7, line 14, before "maintaining" insert --through said tensioning of said flexible cable,--.

In column 7, line 16, following "water" insert --, with said tensioning of said flexible cable providing lifting support for the portion of said elongate structure extending between said anchor and said marine vessel--.

In column 7, line 56, before "comprising" insert --said method--.

In column 7, line 58, following "being" insert --generally fixedly positioned and providing an elongate structure anchor--.

In column 8, line 10, before "maintaining" insert --through said tensioning of said flexible cable,--.

In column 8, line 12, following "water" insert --, with said tensioning of said flexible cable providing lifting support for the portion of said elongate structure extending between said anchor and said marine vessel--.

In column 8, line 37, before "comprising" insert --said method--.

In column 8, line 40, following "being" insert --generally fixedly positioned and providing an elongate structure anchor--.

In column 8, between lines 52 and 53 insert the following paragraph, --through said tensioning of said flexible cable, maintaining a profile control over said elongate structure between the marine vessel and the bed of the body of water, with said tensioning of said flexible cable providing lifting support for the portion of said elongate structure extending between said anchor and said marine vessel;--.

In column 9, line 12, before "comprising" insert --, said method--.

United States Patent and Trademark Office

CERTIFICATE OF CORRECTION

PATENT NO. : 3,978,677

DATED : September 7, 1976

INVENTOR(S) : Joe C. Lochridge

It is certified that error appears in the above-identified patent and that said Letters Patent are hereby corrected as shown below:

In column 10, line 2, before "maintaining" insert --through said tensioning of said flexible cable,--.

In column 10, line 5, following "ter" insert --, with said tensioning of said flexible cable providing lifting support for the portion of said elongate structure extending between said submerged location and said marine vessel--.

In column 10, line 7, before "comprising" insert --said method--.

In column 10, line 10, following "being" insert --generally fixedly positioned and providing an elongate structure anchor--.

In column 10, between lines 20 and 21, insert the following paragraph, --through said tensioning of said flexible cable, maintaining a profile control over said elongate structure between the marine vessel and the bed of the body of water, with said tensioning of said flexible cable providing lifting support for the portion of said elongate structure extending between said anchor and said marine vessel;--.

Signed and Sealed this

Twenty-ninth Day of March 1977

[SEAL]

Attest:

RUTH C. MASON
Attesting Officer

C. MARSHALL DANN
Commissioner of Patents and Trademarks